(12) United States Patent
Quast et al.

(10) Patent No.: US 12,391,151 B2
(45) Date of Patent: Aug. 19, 2025

(54) LONGITUDINAL ADJUSTER FOR A VEHICLE SEAT, AND VEHICLE SEAT

(71) Applicant: Adient US LLC, Plymouth, MI (US)

(72) Inventors: Ingo Quast, Duesseldorf (DE); Erik Sprenger, Wermelskirchen (DE)

(73) Assignee: Adient US LLC, Plymouth, MI (US)

( * ) Notice: Subject to any disclaimer, the term of this patent is extended or adjusted under 35 U.S.C. 154(b) by 43 days.

(21) Appl. No.: 18/497,013

(22) Filed: Oct. 30, 2023

(65) Prior Publication Data

US 2024/0140274 A1    May 2, 2024

(30) Foreign Application Priority Data

Nov. 1, 2022    (DE) ...................... 10 2022 211 556.2
Oct. 16, 2023    (EP) ...................... 23203813

(51) Int. Cl.
*B60N 2/02*        (2006.01)
*B60N 2/06*        (2006.01)

(52) U.S. Cl.
CPC .......... *B60N 2/02253* (2023.08); *B60N 2/067* (2013.01)

(58) Field of Classification Search
CPC ............................ B60N 2/02253; B60N 2/067; B60N 2/02258; B60N 2/0722; F16D 3/68; F16D 3/74
USPC ........................................................ 248/429
See application file for complete search history.

(56) References Cited

U.S. PATENT DOCUMENTS

| | | | | |
|---|---|---|---|---|
| 3,485,062 A * | 12/1969 | Blake | ........................ | F16D 3/64 464/182 |
| 5,273,242 A * | 12/1993 | Mouri | ..................... | B60N 2/067 248/429 |
| 5,467,957 A * | 11/1995 | Gauger | .............. | B60N 2/02246 74/89.33 |
| 5,575,531 A * | 11/1996 | Gauger | .................. | B60N 2/067 297/344.1 |
| 5,762,309 A * | 6/1998 | Zhou | .................. | B60N 2/02246 297/344.11 |
| 5,868,470 A * | 2/1999 | Hyder | ..................... | B60N 2/233 297/362.14 |
| 8,733,725 B2 * | 5/2014 | Kimura | ................ | B60N 2/0705 296/65.13 |
| 9,303,739 B2 * | 4/2016 | Duck | ........................ | H01R 4/62 |

(Continued)

FOREIGN PATENT DOCUMENTS

DE         10315576 B4    9/2007
DE     102012100861 A1    8/2013

(Continued)

*Primary Examiner* — Muhammad Ijaz
(74) *Attorney, Agent, or Firm* — Marshall & Melhorn, LLC

(57) ABSTRACT

A longitudinal adjuster may have one pair of rails and a drive device for the pair of rails. The pair of rails has a first rail and a second rail, on which the first rail is guided displaceably. The drive device has a geared motor with an output shaft, a motor, a gear unit, a spindle, and a coupling arrangement for coupling the spindle and the output shaft. The spindle is mounted rotatably about a spindle axis. The coupling arrangement may have a flexible coupling which is connected in a form-fitting and/or force-fitting manner on the one hand to a spindle end and on the other hand to a shaft end of the output shaft and is designed to damp vibrations and/or to compensate for an offset between the spindle end and the shaft end. A vehicle seat may have the longitudinal adjuster.

13 Claims, 14 Drawing Sheets

(56) References Cited

U.S. PATENT DOCUMENTS

| | | | |
|---|---|---|---|
| 2005/0215328 A1 | 9/2005 | Endou | |
| 2023/0026058 A1* | 1/2023 | Becker | B60N 2/067 |
| 2023/0062040 A1* | 3/2023 | Kuzmz | B60N 2/067 |
| 2024/0140274 A1* | 5/2024 | Quast | B60N 2/067 |

FOREIGN PATENT DOCUMENTS

| | | |
|---|---|---|
| DE | 102021119681 A1 | 2/2023 |
| EP | 3845410 A1 | 7/2021 |
| JP | 2017132319 A | 8/2017 |
| WO | 9516586 A1 | 6/1995 |

* cited by examiner

LONGITUDINAL ADJUSTER FOR A VEHICLE SEAT, AND VEHICLE SEAT

FIELD

The invention relates to a longitudinal adjuster for a vehicle seat, in particular motor vehicle seat, wherein the longitudinal adjuster comprises at least one pair of rails and a drive device for the pair of rails, wherein the pair of rails has a first rail and a second rail, on which the first rail is guided displaceably, wherein the drive device has at least one motor with an output shaft, a gear unit, a spindle, which can be driven by the output shaft of the motor via the gear unit, and a coupling arrangement for coupling the spindle and the output shaft of the motor, wherein the spindle is mounted rotatably about a spindle axis. The invention furthermore relates to a vehicle seat.

BACKGROUND

DE 10 2017 218 492 A1 discloses a longitudinal adjuster, in particular for a vehicle seat. The longitudinal adjuster has at least one pair of rails which is formed from a first rail and a second rail, which is displaceable in the longitudinal direction relative to the first rail, wherein the rails engage alternatingly around one another forming an inner channel. A spindle nut, which is mounted on the second rail, and a spindle, which is operatively connected to the spindle nut, are arranged in the inner channel, wherein a gear which can be driven by a motor and interacts with the spindle is arranged at one end of the first rail. The spindle is mounted at a front end portion of the spindle in the gear and at a rear end portion of the spindle in a rotary bearing of the first rail.

SUMMARY

The invention is based on the problem of improving a longitudinal adjuster of the type mentioned at the beginning, in particular of improving same in respect of acoustic requirements, and of providing a corresponding vehicle seat.

This problem is solved according to the invention by a longitudinal adjuster and a vehicle seat, having the features of the claims.

Advantageous refinements which can be used individually or in combination with one another are the subject matter of the dependent claims.

The longitudinal adjuster according to the invention comprises at least one pair of rails and a drive device for the pair of rails, wherein the pair of rails has a first rail and a second rail, on which the first rail is guided displaceably, wherein the drive device has at least one geared motor with an output shaft, a motor, a gear unit, a spindle, which can be driven by the output shaft of the geared motor via the gear unit, and a coupling arrangement for coupling the spindle and the output shaft of the geared motor, in particular of the gear unit, wherein the spindle is mounted rotatably about a spindle axis, and wherein the coupling arrangement comprises a flexible coupling which is connected in a form-fitting and/or force-fitting manner on the one hand to a spindle end and on the other hand to a shaft end of the output shaft of the gear unit and which connects the spindle end and the shaft end flexibly to each other, in particular directly to each other.

A flexible coupling is understood as meaning in particular an elastic or pliable coupling.

For example, the flexible coupling can connect the spindle end and the shaft end flexibly to each other in such a manner that these two ends are connected pliably and/or compressibly to each other. For example, the spindle end and the shaft end can move flexibly towards each other or move away from each other or move relative to each other compensating for an angular offset using the flexible coupling.

In particular, the flexible coupling can connect the spindle end and the shaft end flexibly to each other in such a manner that the spindle and the output shaft are separated from each other in terms of vibration. In other words: vibrations occurring at the spindle or the shaft are not transmitted. Said vibrations which occur can be absorbed and damped, in particular reduced or completely absorbed, by the flexible coupling.

For example, the flexible coupling can connect the spindle end and the shaft end flexibly to each other in such a manner that said ends are mounted movably relative to each other in at least two degrees of freedom. For example, the spindle end and the shaft end can be mounted movably with respect to each other in a plane with respect to the spindle axis and in a plane perpendicular to the spindle axis, and compensating for an angular offset.

In particular, the flexible coupling connects the spindle end and the shaft end flexibly to each other and is designed to damp vibrations and/or to compensate for an offset between the spindle end and shaft end.

Owing to the fact that the coupling arrangement comprises a flexible coupling, vibration transmission can be reduced to a minimum. Such a longitudinal adjuster therefore has improved acoustic properties. Such a flexible coupling is designed to damp vibrations which occur and/or to compensate for an offset which occurs, for example a parallel offset and/or an shaft offset, in particular angular offset, of the shaft to be connected, in particular an offset of spindle and output shaft.

A first embodiment provides a hose coupling as the flexible coupling. The hose coupling connects the rotatably mounted spindle and the output shaft of the geared motor. A hose coupling is understood as meaning a flexible joining connection between the rigid, rotatably mounted spindle and the rigid, rotatable output shaft of the geared motor using a flexible hose line. The flexible hose line permits a simple and secure connection of spindle and output shaft. Such a flexible coupling which is in the form of the hose coupling has good damping properties and compensates for an angular offset between the spindle and output shaft in a particularly simple manner. Such a flexible coupling makes it possible to dispense with complicated adjustment of the shafts within the pair of rails.

The hose coupling can be connected in a form-fitting and/or force-fitting manner on the one hand to a spindle end of the spindle and on the other hand to a shaft end of the output shaft.

For example, the hose coupling can have an inside diameter which is smaller than an outside diameter of the spindle end and of the shaft end. As a result, a force-fitting connection, in particular a frictionally locking connection, can be obtained between the hose coupling and on the one hand the spindle end and on the other hand the shaft end.

Alternatively or additionally, suitable knurlings can be provided. As a result, a form-fitting connection, in particular profile connection, for example a splined shaft connection, a cross-knurling connection, a longitudinal knurling connection, can be obtained between the hose coupling and on the one hand the spindle end and on the other hand the shaft end.

The hose coupling can be torsionally rigid. For example, the hose coupling can be formed from an insert-moulded fabric. In other words: a hose of the flexible coupling can be formed by a fabric, in particular a textile or plastics fabric, which is insert-moulded with a plastics material. The hose coupling can be configured as an injection-moulded part. For example, the fabric can be configured and insert-moulded in an opposite arrangement, in particular in a diagonal arrangement. Such an insert-moulded fabric as the hose coupling makes it possible to increase the torsional rigidity for transferring torques between the spindle and output shaft.

The hose coupling can alternatively be formed from an elastomer material or a thermoplastic material. For example, an elastomer hose or an elastomer sleeve or a thermoplastic hose or a thermoplastic sleeve can be provided. Hoses or sleeves of this type do not have a reinforcing fabric. Furthermore, the hose coupling is formed from such a material which maintains a torque-transmitting connection between the spindle and output shaft over time and irrespective of temperature fluctuations.

A second embodiment provides a claw coupling as the flexible coupling. The claw coupling can be coupled in a form-fitting manner to the spindle end and to the shaft end. In particular, the claw coupling is coupled on the one hand to the shaft end and on the other hand to the spindle end primarily via a form fit.

The claw coupling can be provided, for example, with respective claws at both ends. A nut element, for example the spindle nut, can be arranged in a form-fitting manner on the spindle end with end-side claw mating elements. The nut element is arranged in a torsionally secured manner in particular on the spindle end. The claw mating element is arranged in a torsionally secured manner in particular on the shaft end.

Such a flexible coupling configured as a claw coupling can be larger than the hose coupling, in particular can have a larger diameter. Owing to such larger dimensions, the claw coupling can transmit higher torques.

A third embodiment provides a compensating coupling as the flexible coupling, which is designed and configured to compensate for an angular offset and/or a parallel offset between the spindle and the output shaft. The compensating coupling can be configured as an injection-moulded part. The compensating coupling can be formed from an elastomer material or a thermoplastic material.

For example, the compensating coupling can be configured as a sleeve coupling which comprises a plurality of recesses which are configured and arranged in such a manner that bending regions and/or expansion regions are alternately formed in order to permit deformations, in particular bendings and/or expansions. For example, the recesses can be configured as slots or grooves or flutes. The recesses can be arranged offset parallel and/or vertically with respect to one another. For example, the recesses can be arranged offset by 90° with respect to one another (vertically with respect to one another).

The compensating coupling can be connected in a form-fitting and/or force-fitting manner on the one hand to a spindle end of the spindle and on the other hand to a shaft end of the output shaft. For example, the compensating coupling can be connected by a clamping connection, a frictionally locking connection or similar on the one hand to a spindle end of the spindle and on the other hand to a shaft end of the output shaft. Alternatively, the compensating coupling can be connected by an integrally bonded connection, for example by an adhesive connection or a welding connection, on the one hand to a spindle end of the spindle and on the other hand to a shaft end of the output shaft.

The problem is furthermore solved according to the invention by a vehicle seat with a longitudinal adjuster according to the invention, in particular a longitudinal adjuster according to the description above.

DESCRIPTION OF THE FIGURES

The invention is explained in more detail below with reference to advantageous exemplary embodiments illustrated in the figures. However, the invention is not restricted to these exemplary embodiments. In the drawings.

DETAILED DESCRIPTION

Figure 1:
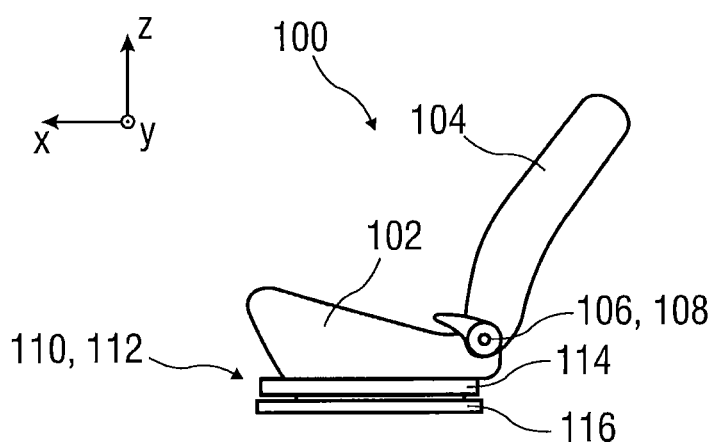
FIG. 1: shows a schematic illustration of a vehicle seat with a longitudinal adjuster.

Mutually corresponding parts are provided with the same reference signs throughout the figures.

A vehicle seat 100 which is illustrated schematically in FIG. 1 in relation to the prior art will be described below using three spatial directions running perpendicularly to one another. With a vehicle seat 100 installed in the vehicle, a longitudinal direction x runs substantially horizontally and preferably parallel to a vehicle longitudinal direction which corresponds to the customary direction of travel of the vehicle. A transverse direction y running perpendicularly to the longitudinal direction x is likewise oriented horizontally in the vehicle and runs parallel to a vehicle transverse direction. A vertical direction z runs perpendicularly to the longitudinal direction x and perpendicularly to the transverse direction y. With a vehicle seat 100 installed in the vehicle, the vertical direction z preferably runs parallel to a vehicle vertical axis.

The position specifications and direction specifications used, such as for example, front, rear, top and bottom, relate to a viewing direction of an occupant seated in the vehicle seat 100 in a normal seat position, wherein the vehicle seat 100 is installed in the vehicle and is oriented in a use position suitable for passenger transport, with an upright backrest 104 and in the direction of travel as customary. However, the vehicle seat 100 may also be installed or moved in a different orientation, for example transversely with respect to the direction of travel. Unless described differently, the vehicle seat 100 is constructed mirror-symmetrically with respect to a plane running perpendicularly to the transverse direction y.

The backrest 104 can be arranged pivotably on a seat part 102 of the vehicle seat 100. For this purpose, the vehicle seat 100 can optionally comprise a fitting 106, in particular an adjustment fitting, rotary fitting, latching fitting or tumble fitting.

The position specifications and direction specifications used, such as for example, radially, axially and in the circumferential direction, relate to an axis of rotation 108 of the fitting 106. Radially means perpendicular to the axis of rotation 108. Axially means in the direction of or parallel to the axis of rotation 108.

The vehicle seat 100 comprises a longitudinal adjuster 110. The longitudinal adjuster 110 comprises, for example, a rail arrangement 112 with a first rail element 114 and a second rail element 116. The first rail element 114 is adjustable in the longitudinal direction x relative to the second rail element 116. The first rail element 114 is fastened to the seat part 102. The second rail element 116 is fastened to a structural element of a vehicle, for example to a vehicle floor. Conventionally, the longitudinal adjuster 110 comprises two rail arrangements 112 arranged parallel to each other. The two rail arrangements 112 can be adjustable, in particular electronically, in synchronism with each other. Only one of the two structurally identical rail arrangements 112 is described below.

For better clarity, the first rail element 114 is referred to in the description below as a top rail 114. Said top rail 114 (also called running rail or slide) is assigned to the vehicle seat 100 and designed to carry said vehicle seat 100. The second rail element 116 is referred to below as a bottom rail 116. The bottom rail 116 is connected fixedly and for example to the floor of a vehicle.

Figure 2:
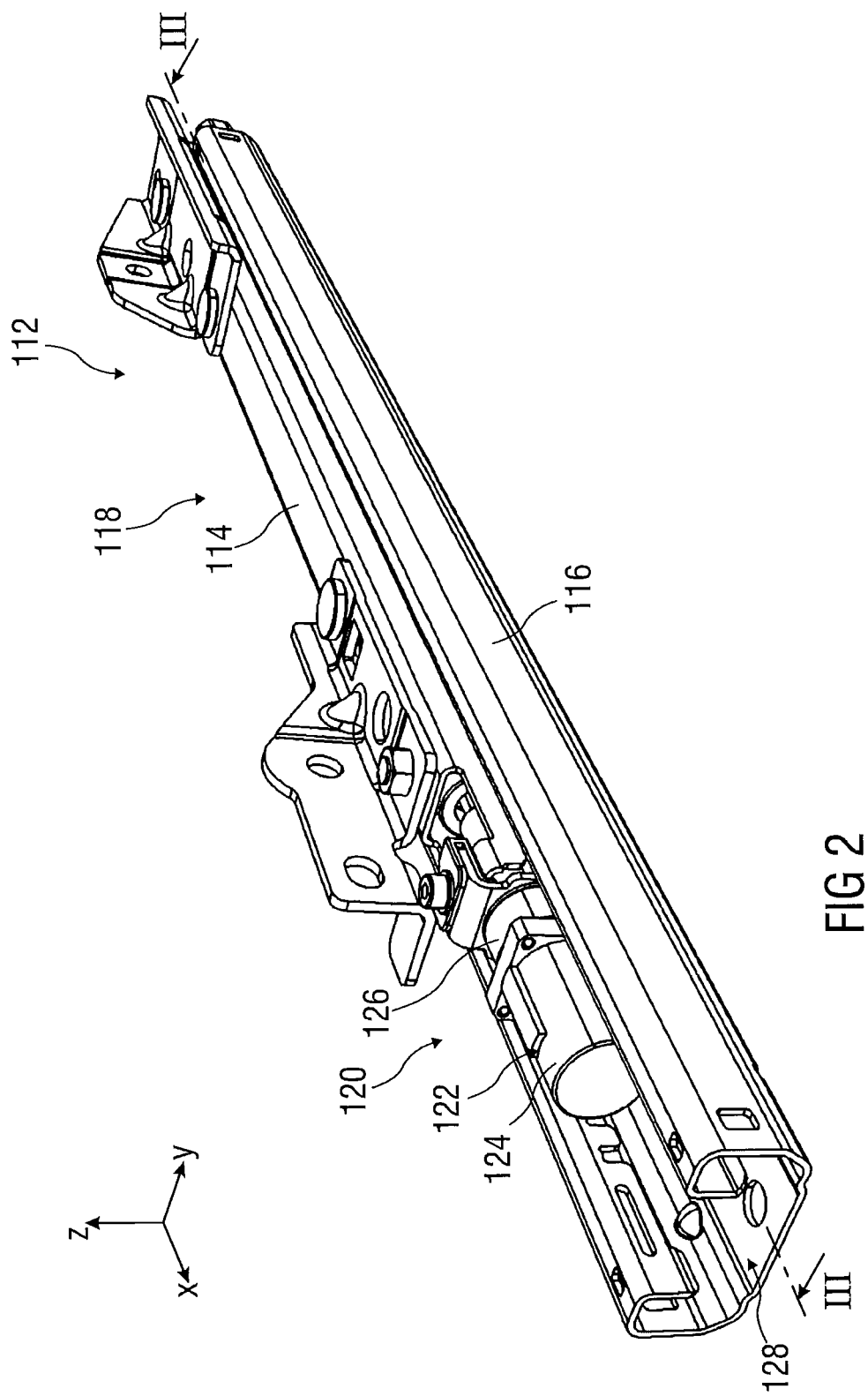
FIG. 2: shows a perspective view of a pair of rails of the longitudinal adjuster according to FIG. 1, FIG. 3: shows a perspective sectional illustration of the pair of rails according to FIG. 2 along the line III-III.

FIG. 2 shows a perspective view of a rail arrangement 112 of the longitudinal adjuster 110 according to FIG. 1, the rail arrangement also being referred to as a pair of rails 118.

The longitudinal adjuster 110 has a drive device 120 for adjusting the seat rail or top rail 114 relative to the floor rail or bottom rail 116. The drive device 120 has a geared motor 122. The geared motor 122 comprises at least one motor 124 and a gear unit 126. In other words: the motor 124 and the gear unit 126 form a unit.

The gear unit 126 and the motor 124 are at least partially arranged in an internal space or cavity 128 formed between the top rail 114 and the bottom rail 116. Alternatively, the geared motor 122 can be arranged completely within the rail arrangement 112, in particular within the bottom rail 116, in particular within the cavity 128, as illustrated.

The motor 124 projects here on the end face at least partially into the top rail 114 at one end thereof. Alternatively, the motor 124 can project out of the top rail upward in the vertical direction z in a manner not illustrated through a recess in the top rail 114, or through the latter.

The gear unit 126 is arranged here completely in the cavity 128 formed between the top rail 114 and the bottom rail 116. The motor 124 and the gear unit 126 are attached here together in an end region of the pair of rails 118. This permits easy accessibility of the motor 124 and of the gear unit 126, and therefore these components may be possibly easily exchangeable or repairable even when a longitudinal adjuster 110 is installed in a vehicle.

The gear unit 126 is connectable to the top rail 114, in particular in a force-fitting and form-fitting manner, for example screwed, or in an integrally bonded manner, for example welded with a seam, and/or in a form-fitting manner, for example pressed, in order to be able to transmit high forces.

Figure 3:
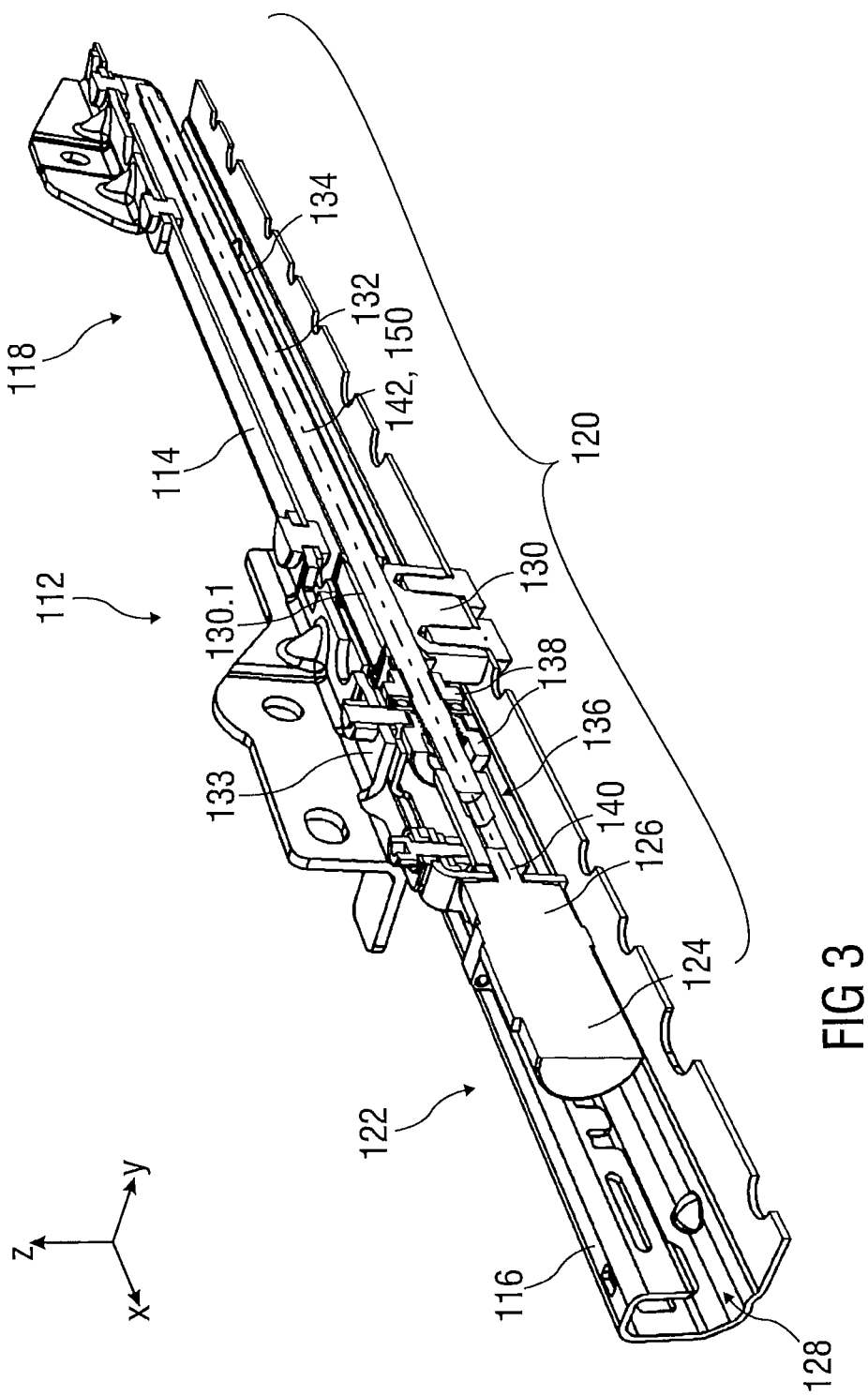

FIG. 3 shows a sectioned longitudinal illustration of one of the pairs of rails 118 of the longitudinal adjuster 110.

The drive device 120 is configured, for example, as a spindle drive. The drive device 120 comprises at least the motor 124, the gear unit 126, a spindle block 130, which is fixed with respect to the bottom rail 116 and has an internal thread 127, and a spindle 132, which has an external thread 134. The spindle 132, which is driveable by the motor 124, is mounted rotatably and in a longitudinally movable manner in the spindle block 130, which is fastened to the bottom rail 116.

The spindle 132 is mounted rotatably and supported axially at least via a spindle nut 138. In the example, two spindle nuts 138 are provided. The respective spindle nut 138 is fixedly connected to the top rail 114. The respective spindle nut 138 is positioned in a torsionally secured manner on the spindle 132 and is supported axially on a bearing plate 133, which is connected fixedly to the top rail 114.

The spindle 132 is mounted in the spindle block 130 and the spindle nut 138 on the bearing plate 133 so as to be rotatable about a spindle axis 142. The geared motor 122, the coupling arrangement 136 and the spindle 132 are arranged on a common axis 150 within the pair of rails 118. For example, the common axis 150 is arranged in the cavity 128 of the pair of rails 118. The common axis 150 is surrounded by the top rail 114 and the bottom rail 116.

In the case of a fixed spindle block 130, the spindle 132 is mounted in a longitudinally movable manner in the spindle block 130 along the spindle axis 142 for the longitudinal adjustment of the vehicle seat 100 (illustrated in FIG. 1). The spindle 132 which is mounted in a longitudinally movable manner and rotatably in the fixed spindle block 130 realizes a longitudinal adjustment of the vehicle seat 100 (illustrated in FIG. 1) here. An internal thread 130.1 of the spindle block 130 is configured in particular as a movement thread. The internal thread 130.1 converts a rotational movement of the spindle 132 into a linear movement of the spindle 132 relative to the spindle block 130 (illustrated in FIG. 3). For this purpose, the internal thread 130.1 is configured, for example, as a sliding thread, a trapezoidal thread or a deep lead angle thread.

The drive device 120 furthermore comprises the coupling arrangement 136 for coupling the geared motor 122, in particular the gear unit 126, to the spindle 132. The coupling arrangement 136 is arranged in particular between the spindle 132 and an output shaft 140 of the geared motor 122. The coupling arrangement 136 is configured for damping vibrations and/or for compensating for tolerances, in particular positional tolerances.

Figure 4:
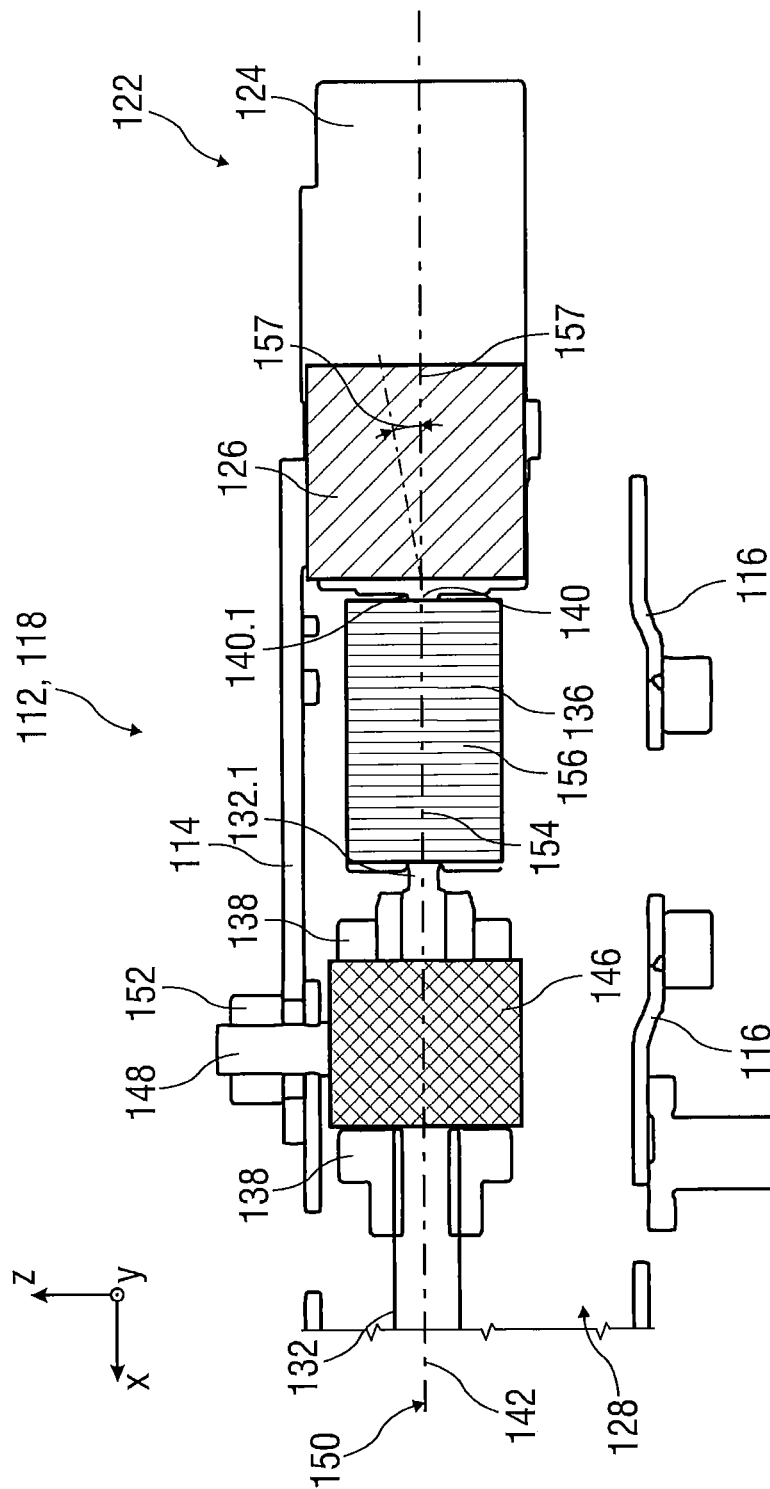
FIG. 4: shows schematically an enlarged sectional illustration of a coupling between geared motor and spindle of the longitudinal adjuster.

FIG. 4 shows a schematic sectional illustration of an end-face end of the longitudinal adjuster 110 from FIG. 2, in particular an enlarged sectional illustration of the coupling arrangement 136 between geared motor 122 and spindle 132 of the longitudinal adjuster 110.

FIG. 4 shows the same end-face end of the longitudinal adjuster 110 in which, for example, two spindle nuts 138, the coupling arrangement 136, the gear unit 126 and the motor 124 are arranged.

The two spindle nuts 138, the coupling arrangement 136 and the gear unit 126, at least in part, are arranged completely in the cavity 128 of the pair of rails 118. The motor 124 protrudes axially from the cavity 128. A spindle bearing 146 arranged between the two spindle nuts 138 is connected to the top rail 114 by a connecting bolt 148 and a connecting nut 152.

The spindle 132 is driveable by the output shaft 140 of the geared motor 122. At least the output shaft 140 acting as the output shaft of the geared motor 122, an axis of rotation 154 of the rotatable coupling arrangement 136 and the spindle axis 142 of the spindle 132 are arranged substantially in axial alignment. Substantially in axial alignment means that the output shaft 140, the axis of rotation 154 of the rotatable coupling arrangement 136 and the spindle axis 142 can lie in alignment, with angular deviations and/or an axial offset.

In order to couple the spindle 132 to the output shaft 140 and therefore for the transmission of torque, the coupling arrangement 136 is provided.

The coupling arrangement 136 comprises a flexible coupling 156. The flexible coupling 156 is connected in a form-fitting and/or force-fitting manner on the one hand to a spindle end 132.1 and on the other hand to a shaft end 140.1 of the output shaft 140. The flexible coupling 156 can connect here the spindle end 132.1 and the shaft end 140.1 directly flexibly to each other.

For example, the flexible coupling 156 can connect the spindle end 132.1 and the shaft end 140.1 flexibly to each other in such a manner that these two ends 132.1, 140.1 are connected pliably and/or compressibly to each other. For example, using the flexible coupling 156, the spindle end 132.1 and the shaft end 140.1 can move flexibly towards each other or move away from each other or can move relative to each other compensating for an angular offset.

In particular, the flexible coupling 156 can connect the spindle end 132.1 and the shaft end 140.1 flexibly to each other in such a manner that the spindle 132 and the output shaft 140 are separated from each other in terms of vibration. In other words: vibrations which occur at the spindle 132 or the shaft 140 are not transmitted. Said vibrations which occur can be absorbed and damped, in particular reduced or completely absorbed, by the flexible coupling 156.

For example, the flexible coupling 156 can connect the spindle end 132.1 and the shaft end 140.1 flexibly to each other in such a manner that these ends 132.1, 140.1 are mounted movably relative to each other in at least two degrees of freedom, in particular in the longitudinal direction x, in the transverse direction y and/or in the vertical direction z or in an intermediate position. For example, the spindle end 132.1 and the shaft end 140.1 can be mounted movably with respect to each other at least in a plane with respect to the spindle axis and in a plane perpendicular to the spindle axis 142 and/or compensating for an angular offset.

The flexible coupling 156 is designed to damp vibrations and/or to compensate for an offset 157, in particular an angular offset and/or a parallel offset, between spindle end 132.1 and shaft end 140.1.

Various embodiments of the flexible coupling 156 will be described below. All of the other components of the gear unit 126 and of the drive device 120 are constructed identically for all of the embodiments described below, and are described by the same reference signs.

Figure 5:
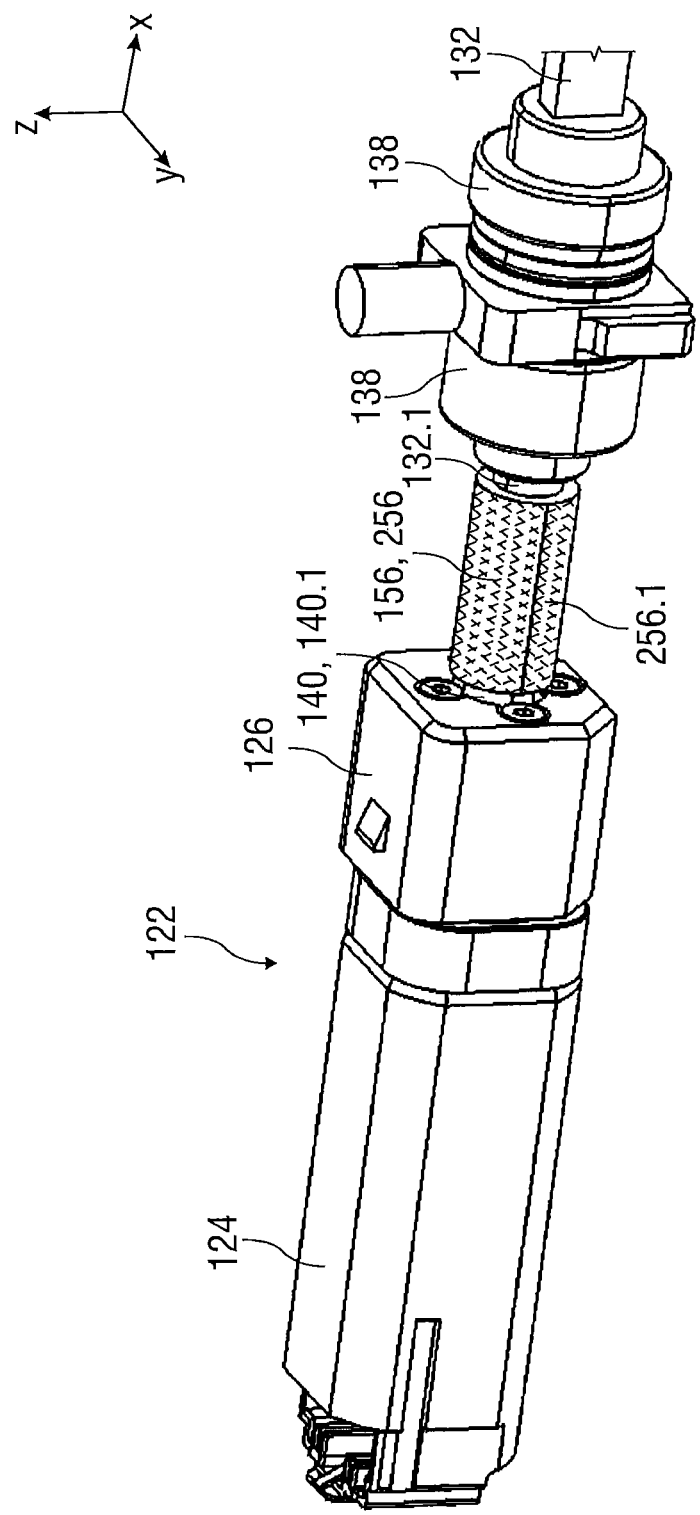
FIG. 5: shows schematically a perspective view of a first embodiment of the coupling between geared motor and spindle of the longitudinal adjuster.

FIG. 5 shows schematically a perspective view of a first embodiment of the flexible coupling 156, which is configured as a hose coupling 256.

The hose coupling 256 connects the rotatably mounted spindle 132 and the output shaft 140 of the geared motor 122. The hose coupling 256 can be connected in a form-fitting and/or force-fitting manner on the one hand to the spindle end 132.1 of the spindle 132 and on the other hand to the shaft end 140.1 of the output shaft 140.

The hose coupling 256 can be torsionally rigid. For example, the hose coupling 256 can be formed from an insert-moulded fabric 256.1. The hose coupling 256 can be configured as an injection-moulded part. For example, the fabric 256.1 can be configured as a cross fabric with a thread arrangement woven crossways, or a diagonal fabric with a thread arrangement woven diagonally, and can be insert-moulded with a plastics material, in particular an elastomer material or a thermoplastic material. Such an insert-moulded fabric 256.1 as the hose coupling 256 enables the torsional rigidity for transmitting torques between spindle 132 and output shaft 140 to be increased.

Alternatively, use may also be made of a different form of geometries and profiles, for example intermeshing toothings, which permit a form-fitting connection or force-fitting connection or integrally bonded connection between hose coupling 256 and spindle end 132.1 on the one hand and shaft end 140.1 on the other hand.

Figure 6:
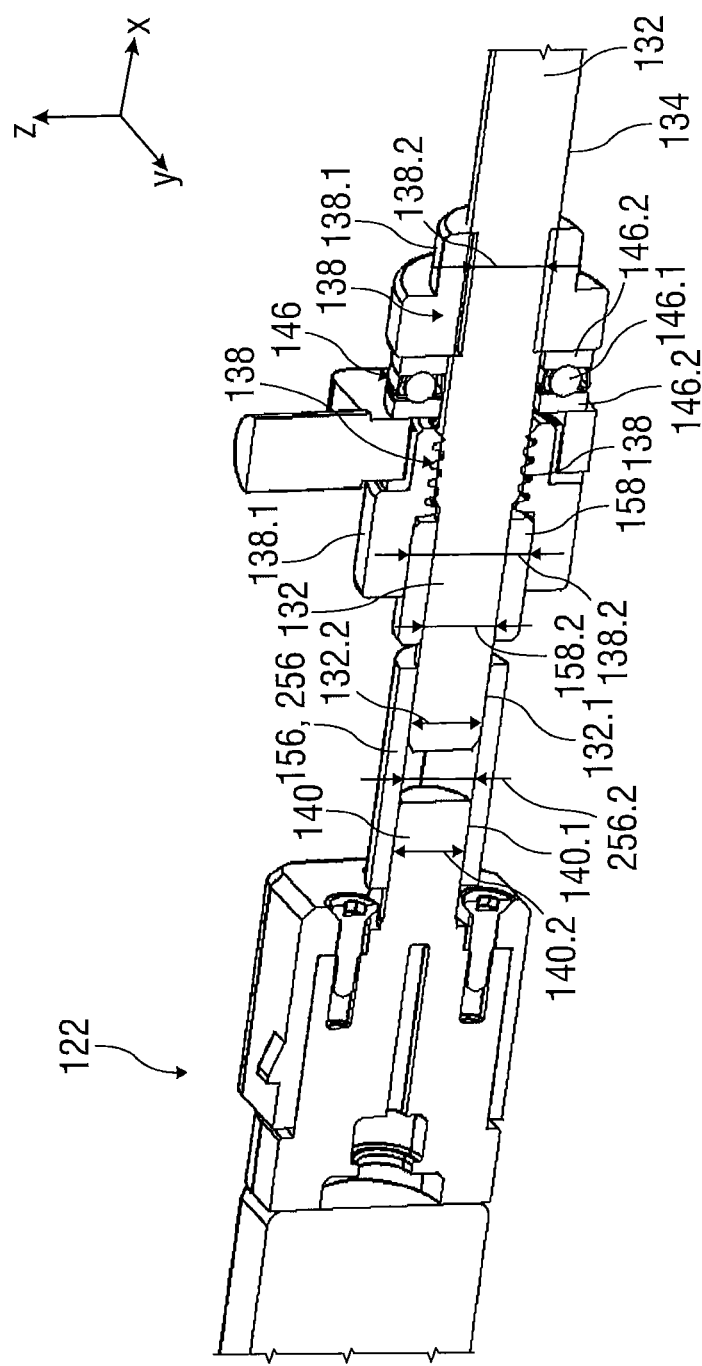
FIG. 6: shows an enlarged perspective sectional illustration of the first embodiment of the coupling according to FIG. 5, FIG. 7: shows an enlarged perspective sectional illustration of the first embodiment of the coupling according to FIG. 5 with an alternative shaft connection.

FIG. 6 shows an enlarged perspective sectional illustration of the first embodiment of the flexible coupling 156, which is configured as a hose coupling 256, according to FIG. 5.

The hose coupling 256 can have an inside diameter 256.2 which is smaller than an outside diameter 132.2 of the spindle end 132.1 and an outside diameter 140.2 of the shaft end 140.1. As a result, a force-fitting connection, in particular a frictionally locking connection, can be obtained between the hose coupling 256 and, on the one hand, the spindle end 132.1 and, on the other hand, the shaft end 140.1.

In the example shown, two spindle nuts 138 are connected to the spindle 132 in a torsionally secured manner.

The spindle nut 138 arranged in the direction of the geared motor 122 is connected to the spindle 132 in a torsion-proof manner by a press-fit bushing 158, for example. The press-fit bushing 158 can be plugged onto the spindle end 132.1 and can be press-fitted in a collar 138.1 of the spindle nut 138. The collar 138.1 has a larger inside diameter 138.2 than the outside diameter 132.2 of the spindle end 132.1. The press-fit bushing 158 has a larger outside diameter 158.1 than the inside diameter 138.2, and therefore the press-fit bushing 158 can be press-fitted into the collar 138.1 and is connectable to the collar 138.1 in a force-fitting, in particular frictionally locking manner. In addition, the press-fit bushing 158 has an inside diameter 158.2 which is smaller than the outside diameter 132.2 of the spindle end 132.1, and therefore the press-fit bushing 158 is connectable to the spindle end 132.1 in a force-fitting, in particular frictionally locking manner.

The press-fit bushing 158 can additionally be configured and arranged on the spindle 132 in such a manner that said press-fit bushing 158 serves in the longitudinal direction x as a longitudinal limitation for the hose coupling 256.

The respective spindle nut 138 can additionally be connected in sections to the spindle 132, for example by a form-fitting connection and/or a force-fitting connection, in particular a frictionally locking connection. For example, the respective spindle nut 138 can be provided with an internal thread 138.0. The internal thread 138.0 is connected in a form-fitting manner to the external thread 134 of the spindle 132.

Alternatively or additionally (not illustrated specifically), at least one of the spindle nuts 138 can have an inside diameter 138.2 which is smaller than the outside diameter 132.2 of the spindle 132.

The spindle bearing 146 can comprise, for example, a ball bearing or a roller bearing or an axial ball bearing 146.1 for absorbing axial forces in a first load direction and/or a bearing bushing 146.2 for the radial mounting of the spindle 132 and for absorbing axial forces in a second load direction and can be arranged between the two spindle nuts 138.

Vibration transmissions can be reduced or avoided, and shaft offsets, in particular angular offsets, compensated for by such a simple hose coupling 256 according to FIGS. 5 to 8. In addition, a complicated adjustment of spindle 132 and output shaft 140 can be omitted.

Figure 7:
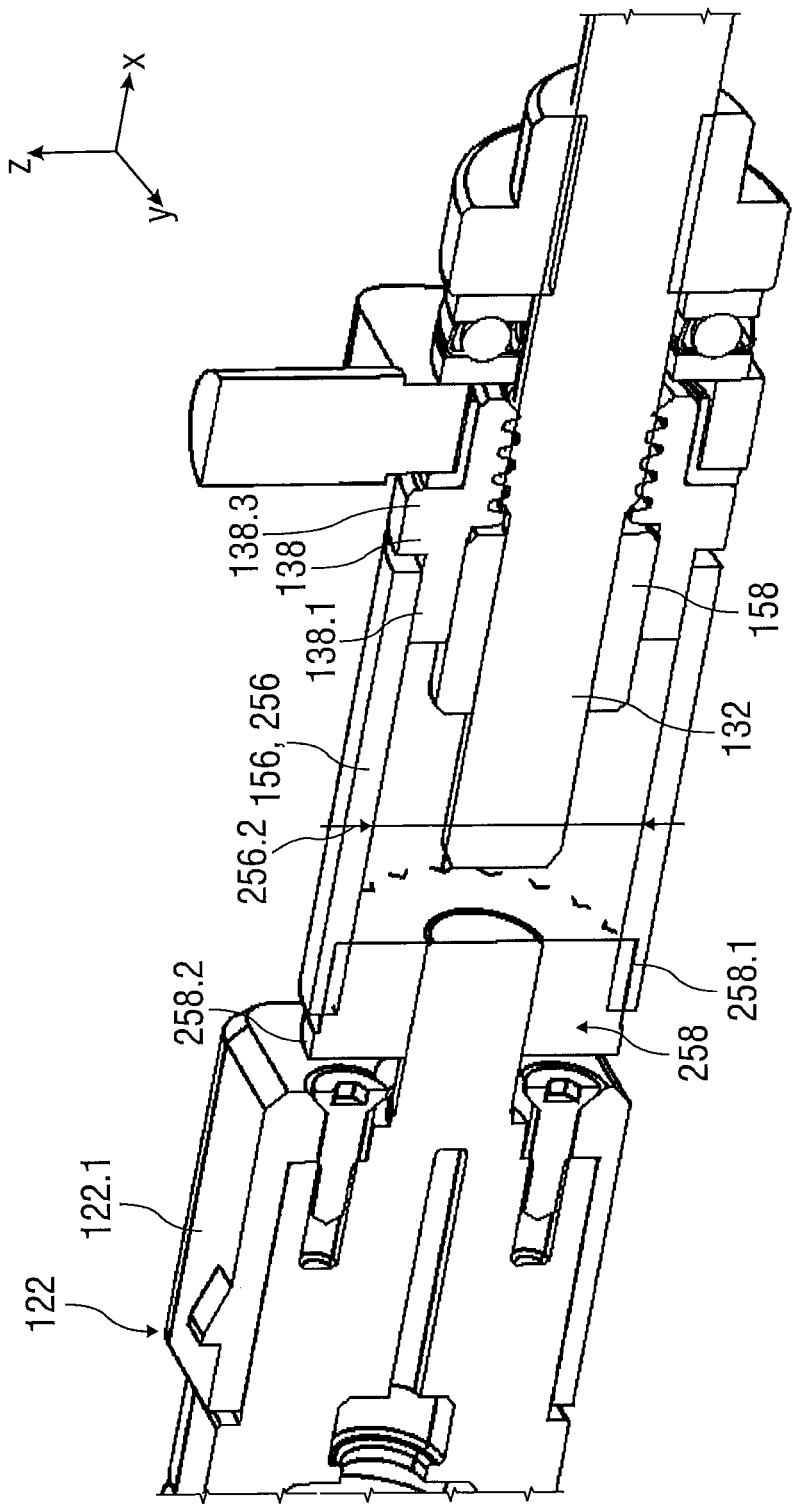

FIG. 7 shows an enlarged perspective sectional illustration of the first embodiment of the coupling 156, which is configured as a hose coupling 256, with an alternative shaft connection. Instead of a direct force-fitting connection of the hose coupling 256 on the spindle 132 and the output shaft 140 according to FIGS. 5 and 6, the hose coupling 256 according to FIG. 7 has a larger diameter, in particular a larger inside diameter 256.2. The hose coupling 256 according to FIG. 7 is arranged on the shaft end 140.1 via a coupling element 258 and is, in particular, pressed onto the output shaft 140 by a form-fitting connection and/or force-fitting connection. In particular, the coupling element 258 is pressed onto the shaft end 140.1 of the output shaft 140. A contact diameter with respect to the hose coupling 256 is enlarged by the coupling element 258.

For the form-fitting connection, the coupling element 258 can have a knurled edge 258.1 or the like, for example a diamond knurl edge.

In addition, the coupling element 258 can have a collar 258.2. The collar 258.2 is designed to fix the hose coupling 256 in the longitudinal direction x and therefore axially, or to position the same at a defined position. This ensures that the hose coupling 256 does not enter into contact with a fixed housing 122.1 of the geared motor 122.

On the spindle side, the hose coupling 256 is pressed onto the spindle nut 138, in particular onto the enlarged collar 138.1 of the drive-side spindle nut 138.

The collar 138.1 is configured in the longitudinal direction x in such a manner that it serves at the same time as a longitudinal limitation for the hose coupling 256.

The drive-side spindle nut 138 is in turn connected in a torsionally secured manner to the spindle 132, as described previously with reference to FIGS. 5 to 6. For this purpose, in an analoguous manner for all of the exemplary embodiments described here, the press-fit bushing 158 is pressed onto the spindle 132.

The drive-side spindle nut 138 can have, on the outer circumference, a stop ring 138.3, in particular a peripheral collar, which serves as a longitudinal limitation or axial limitation for the hose installation of the hose coupling 256.

Also, in addition, knurled edges 258.1 and/or diamond knurl edges can be provided analogously to the additional part or coupling element 258 on the collar 138.1 of the spindle nut 138 and/or on the outer circumference of the coupling element 258 for the form-fitting connection and/or transmission of torque.

Figure 8:
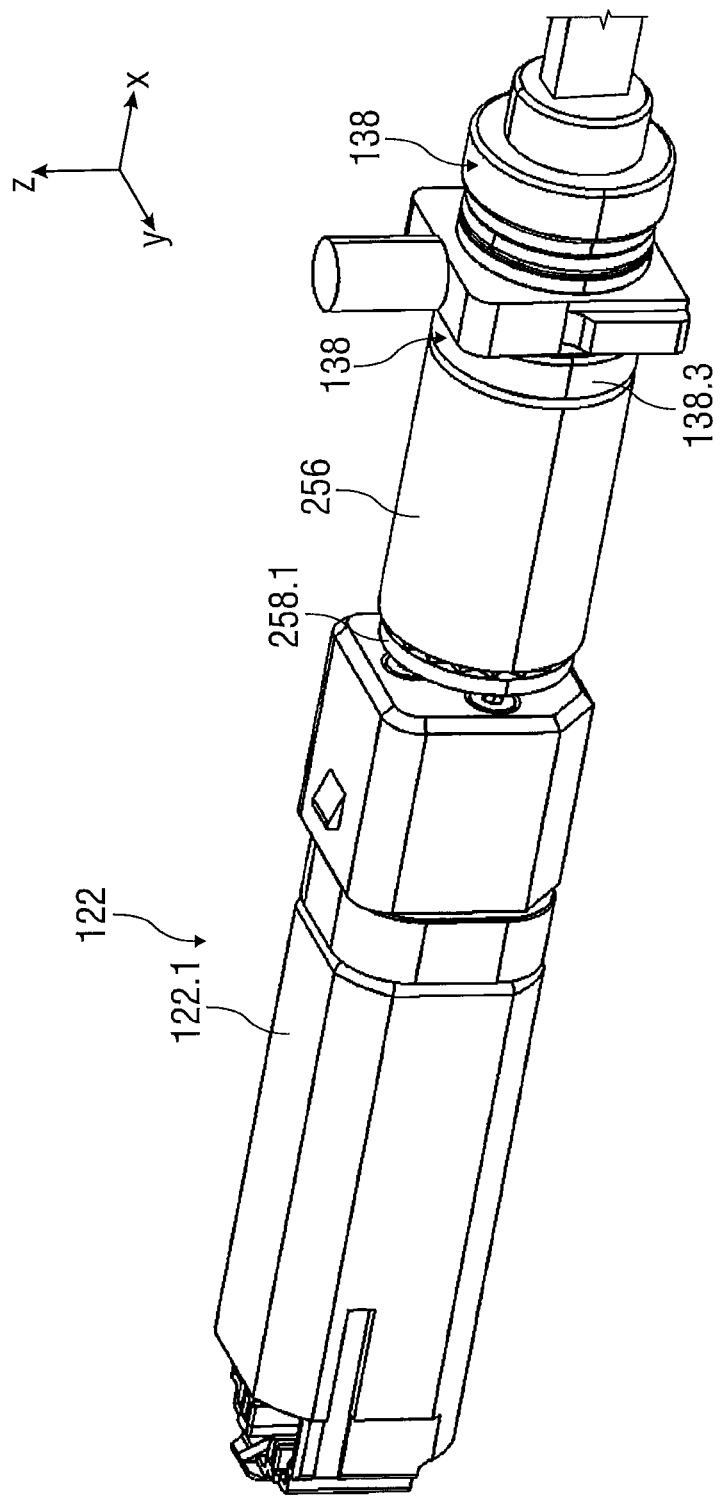
FIG. 8: shows schematically a perspective view of the first embodiment of the coupling with the alternative shaft connection according to FIG. 7, FIG. 9: shows schematically a perspective view of a second embodiment of the coupling between geared motor and spindle of the longitudinal adjuster.

FIG. 8 shows schematically a perspective view of the first embodiment of the coupling 156, which is configured as a hose coupling 256, with the alternative shaft connection according to FIG. 7. The hose coupling 256 is not shown transparently.

The knurled edge 258.1 of the hose coupling 256 can be configured as a separate unit, in particular as a knurled disc or a knurled ring, and can be arranged between the hose coupling 256 and the housing 122.1 of the geared motor 122.

The spindle nut 138 can have the stop ring 138.3 which protrudes vertically from the collar 138.1 (illustrated in FIG. 7). The stop ring 138.3 and the separate knurled edge 258.1 serve as a longitudinal limitation of the hose coupling 256, arranged between them, during the installation.

In addition, the stop ring 138.3 for the form fit and transmission of torque can be knurled or crimped (not illustrated specifically).

Figure 9:
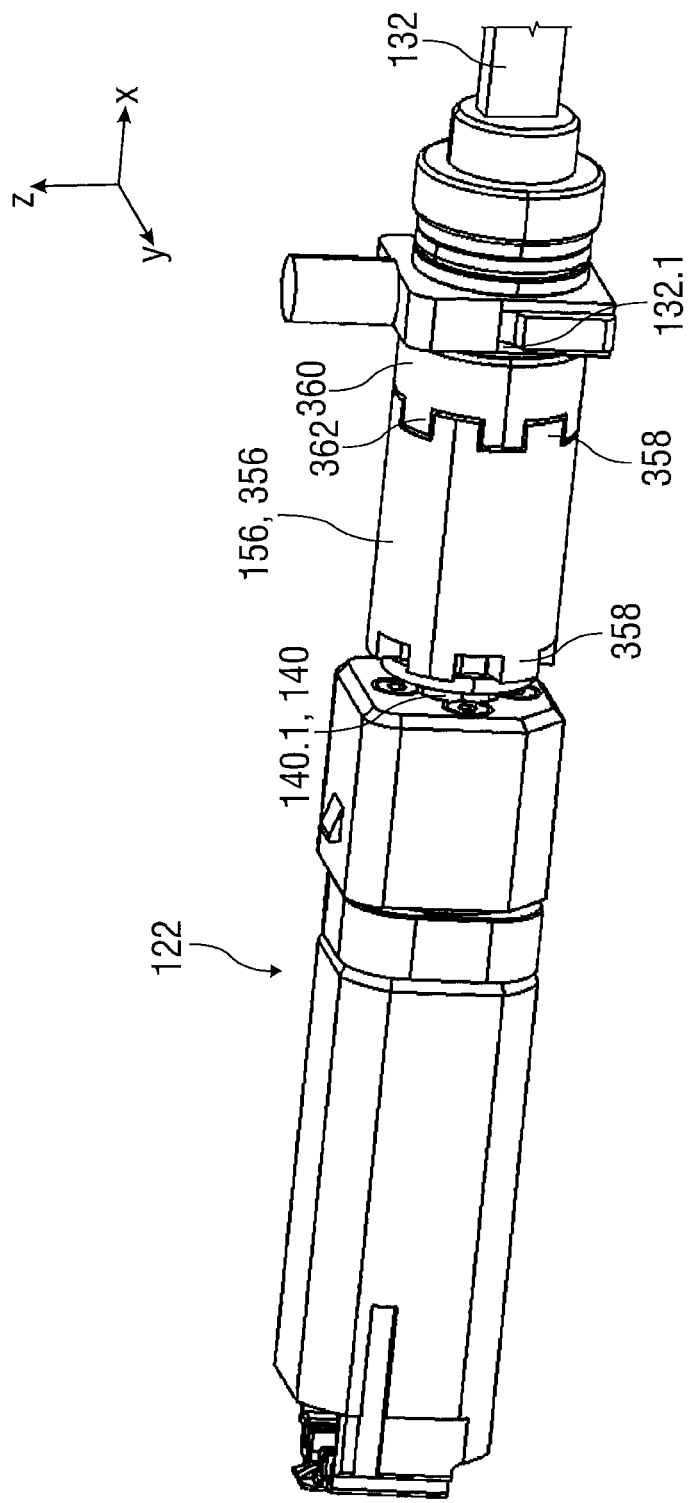

FIG. 9 shows schematically a perspective view of a second embodiment of the flexible coupling 156, which is configured as a claw coupling 356, between the geared motor 122 and spindle 132 of the longitudinal adjuster 110 (illustrated in FIGS. 1 and 2).

The claw coupling 356 is coupled in a form-fitting manner to the spindle end 132.1 and to the shaft end 140.1. The claw coupling 356 comprises claws 358, for example, at its longitudinal-side ends. A nut element 360 with claw mating elements 362 is arranged on the spindle end 132.1.

The nut element 360 is arranged on the spindle 132 in a torsionally secured manner by a form-fitting connection and/or a force-fitting connection.

In addition, the shaft end 140.1 can be provided with claw mating elements 362 (not illustrated).

The claw coupling 356 is sleeve-shaped or cylindrical. The claw coupling 356 is formed, for example, from an elastomer material or a thermoplastic material. In addition, the claw coupling 356 can comprise fabric reinforcements analogously to the flexible coupling 156 (illustrated in FIG. 5).

The claw coupling 356 is configured in particular as an injection-moulded part. The claw coupling 356 can be connected, primarily by a form-fitting connection, for example, on the one hand to the output shaft 140, in particular to the shaft end 140.1, and on the other hand to the nut element 360, which for example is pressed onto the spindle 132 and is torsion-proof in relation to the spindle 132.

Figure 10:
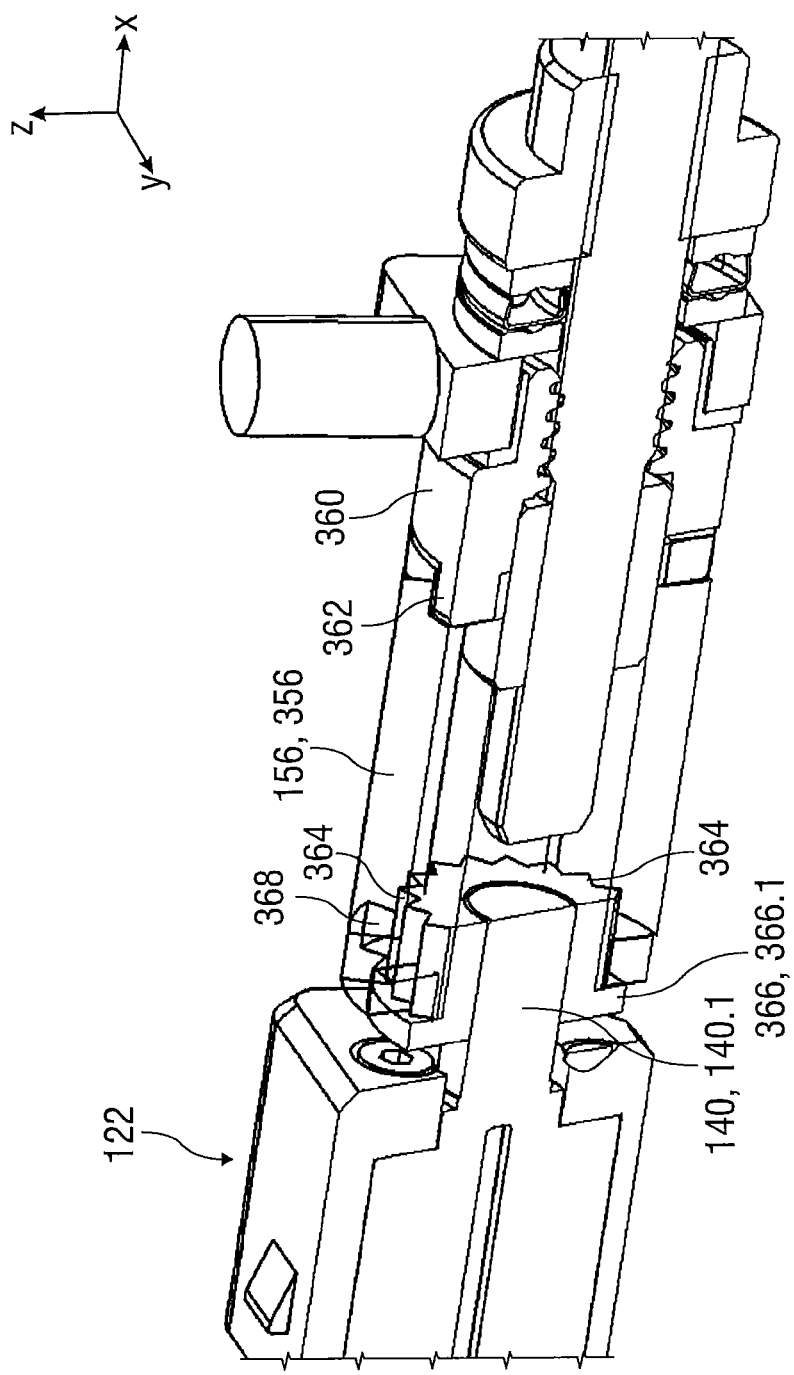
FIG. 10: shows an enlarged perspective and partially transparent sectional illustration of the second embodiment of the coupling according to FIG. 9, FIG. 11: shows an enlarged perspective and partially transparent illustration of the second embodiment of the coupling according to FIG. 9, FIG. 12: shows a further enlarged perspective and partially transparent sectional illustration of the second embodiment of the coupling according to FIG. 9, FIG. 13: shows a perspective illustration of a third embodiment of the coupling between geared motor and spindle of the longitudinal adjuster.
Figure 11:
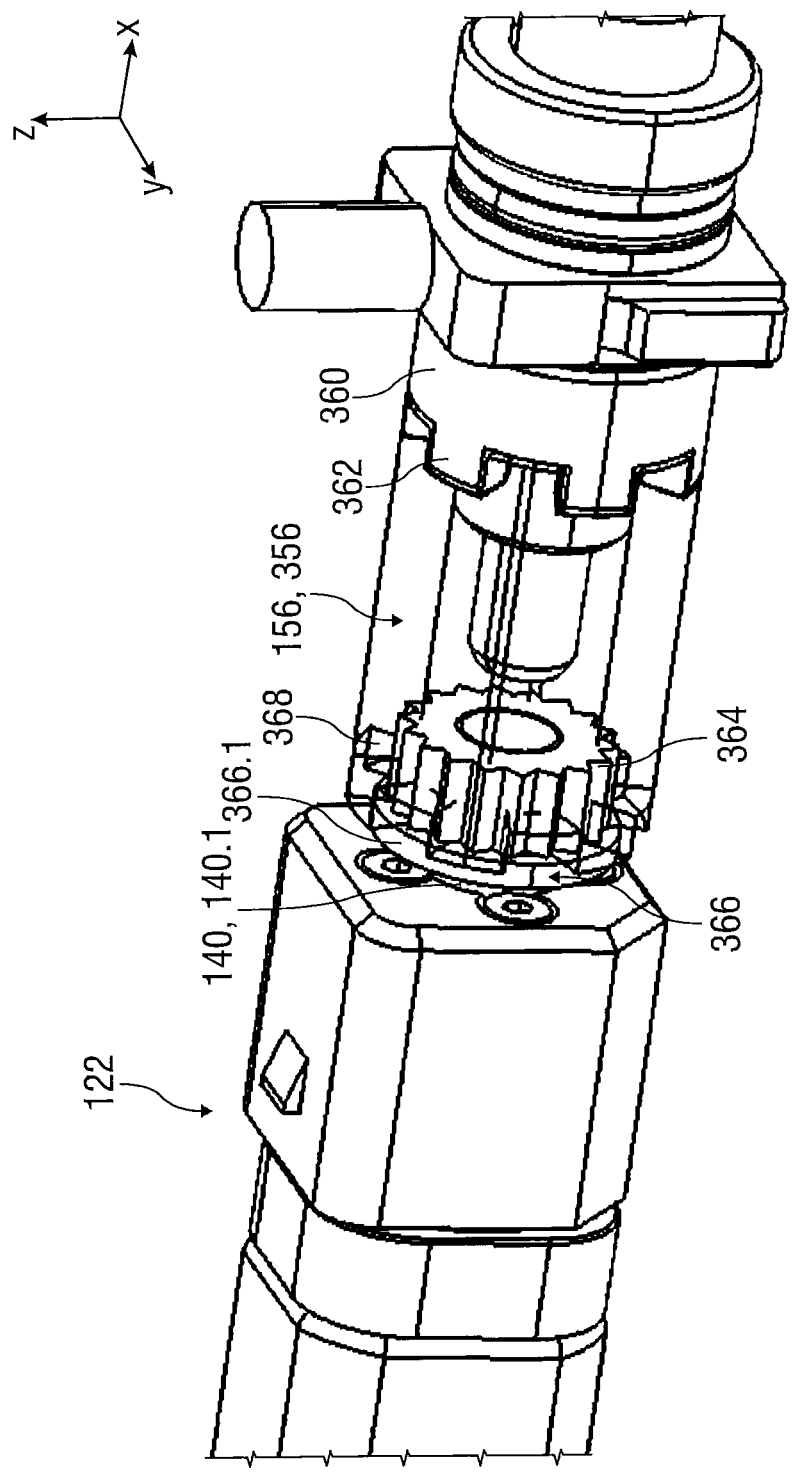
Figure 12:
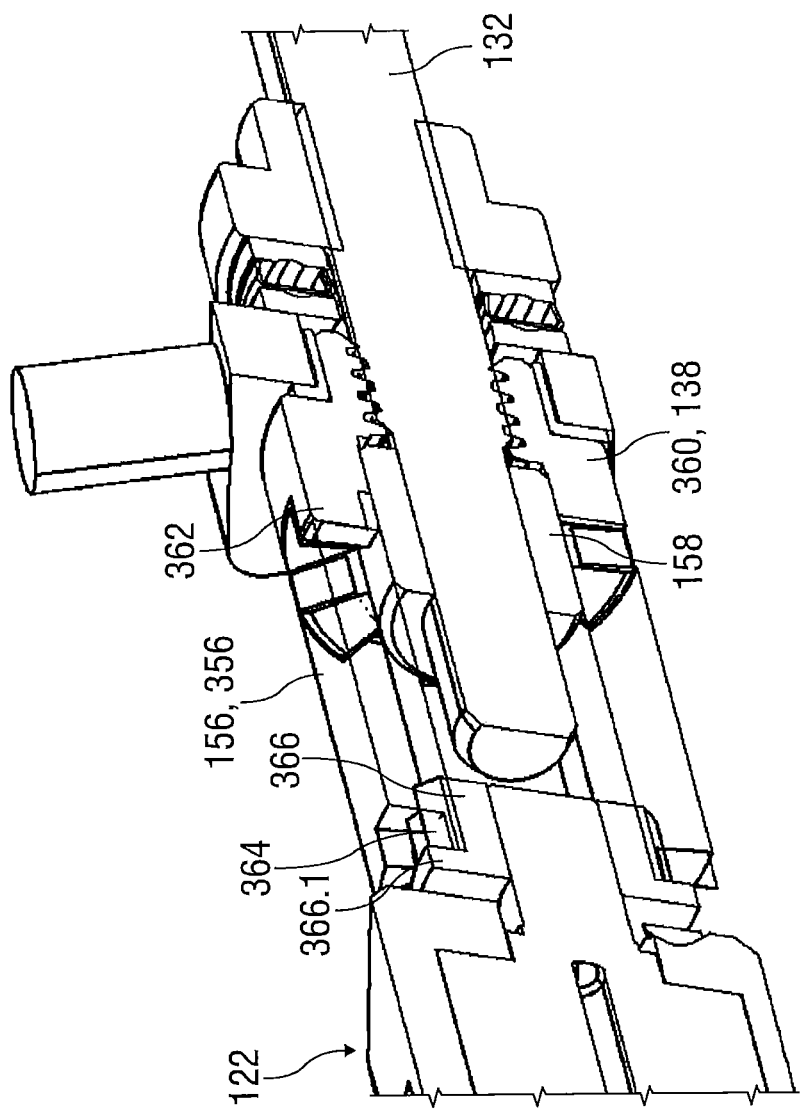

FIGS. 10 to 12 each show an enlarged, perspective and partially transparent sectional illustration of the second embodiment of the flexible coupling 156, which is configured as a claw coupling 356 according to FIG. 9.

Instead of the claws 358 and the claw mating elements 362, an external toothing 364 is provided on the output shaft on the drive side, in the region of the output shaft 140, in particular of the shaft end 140.1 thereof. Alternatively, an additional element 366 (not illustrated specifically), in particular a gearwheel or toothed ring, can be provided with such an external toothing 364. The external toothing 364 projects into a cavity of the claw coupling 356. The additional element 366 (also called pressed-on driver) can have a flange 366.1 in order to press the claw coupling 356 axially into the cutouts of the claw mating elements 362 during installation.

The claw coupling 356 can have a carry-along contour 368, for example a corresponding internal toothing or a carry-along tongue or a carry-along tooth, in an overlapping region with the external toothing 364 of the output shaft 140. Alternatively, the claw coupling 356 can be connected on the drive side, in the overlapping region with the shaft end 140.1, in a form-fitting manner, for example by being pressed on, to the output shaft 140, as described previously with reference to FIGS. 5 and 6.

The exemplary claw coupling 356 according to FIGS. 9 and 10 can comprise, on both ends, as an inner contour, the carry-along contour 368 for coupling to the external toothing 364, configured as a drive toothing, of the output shaft 140 and also the claws 358 for the claw mating elements 362 for coupling to the nut element 360.

The nut element 360 can also be formed by the spindle nut 138, as shown in FIG. 12. In this case, the collar 138.1 of the spindle nut 138 is provided with the claw mating elements 362. The spindle nut 138 is arranged on the spindle 132 in a torsionally secured manner by the press-fit bushing 158.

Figure 13:
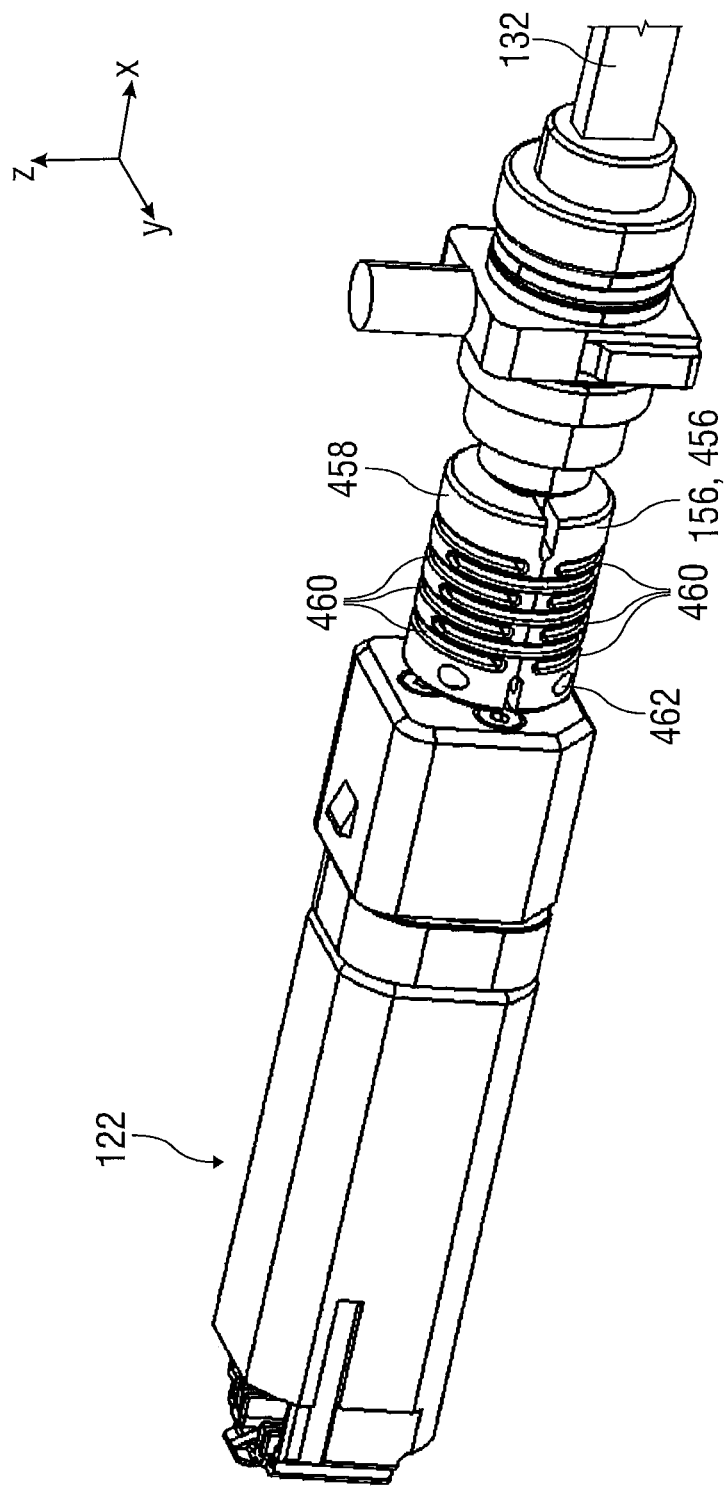
Figure 14:
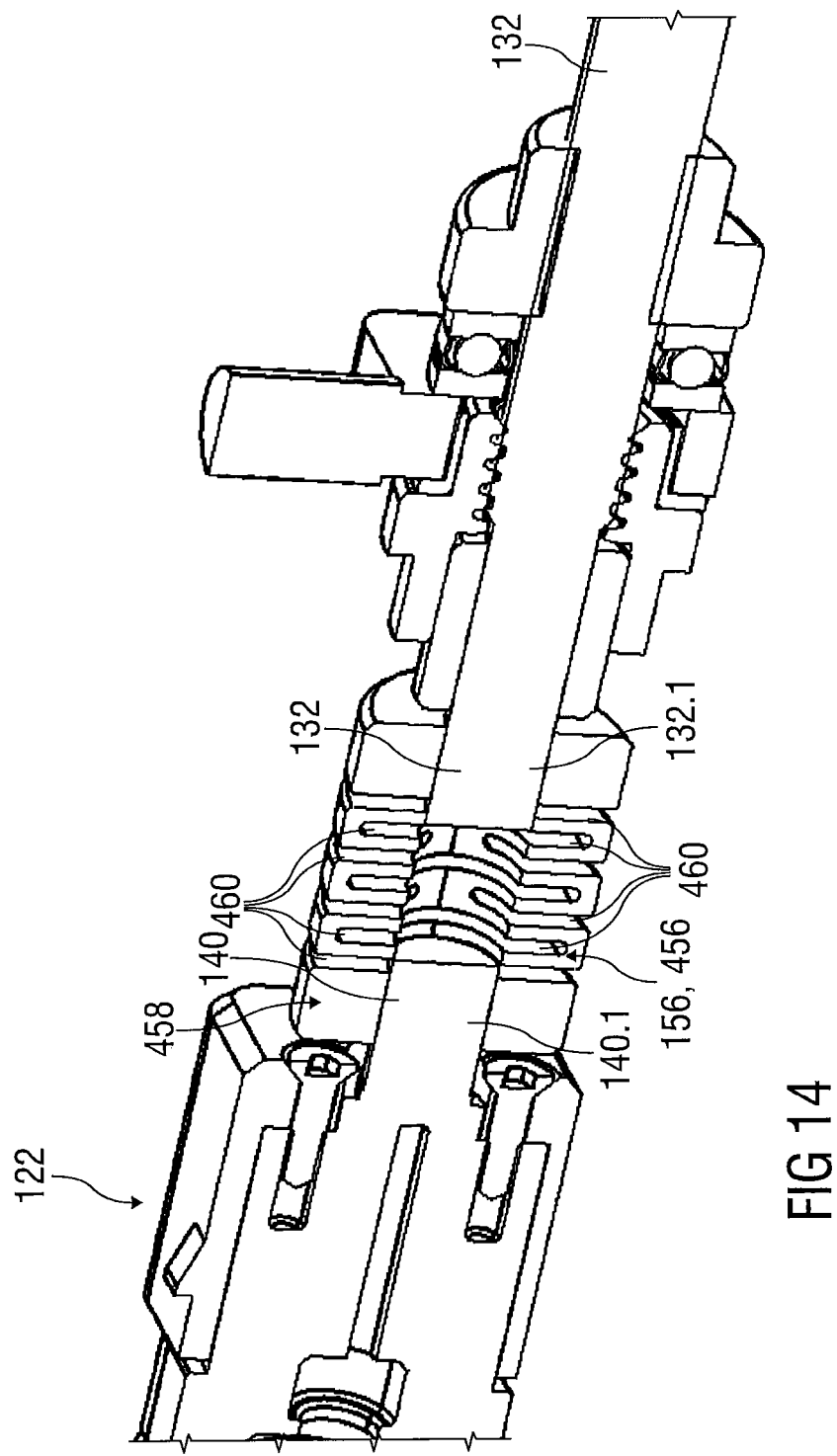
FIG. 14: shows an enlarged perspective and partially transparent sectional illustration of the third embodiment of the coupling according to FIG. 13.

FIG. 13 shows a perspective illustration of a third embodiment of the flexible coupling 156 between the geared motor 122 and spindle 132. The flexible coupling 156 according to FIGS. 13 and 14 is configured as a compensating coupling 456.

The compensating coupling 456 is configured and designed to compensate for an offset 157 (illustrated in FIG. 4), in particular an angular offset and/or a parallel offset, between the spindle 132 and the output shaft 140. The compensating coupling 456 can be configured as an injection-moulded part. The compensating coupling 456 can be formed from an elastomer material or a thermoplastic material or from metal.

For example, the compensating coupling 456 can be configured as a sleeve coupling 458 which comprises a plurality of recesses 460. The recesses 460 are configured and arranged in particular in such a manner that bending regions and/or expansion regions for the compensating coupling 456 are alternately formed in order to permit deformations, in particular bendings and/or expansions. For example, the recesses 460 can be configured as slots or grooves or flutes. The recesses 460 can be arranged offset parallel and/or perpendicularly to one another. For example, the recesses 460 can be arranged offset with respect to one another by 90°.

Angular offsets and/or parallel offsets can therefore be compensated for by the recesses 460, which are arranged offset and in relation to one another by 90°, in the form of slots since bending regions thus defined alternately permit a deformation, irrespective of how the angle of rotation of the output shaft 140 is with respect to an angular deviation of the connected axes of rotation.

The compensating coupling 456 can be connected in a form-fitting and/or force-fitting manner on the one hand to the spindle end 132.1 of the spindle 132 and on the other hand to the shaft end 140.1 of the output shaft 140.

For example, the compensating coupling 456 can be connected on the one hand to the spindle end 132.1 and on the other hand to the shaft end 140.1 by a clamping connection, a frictionally locking connection or the like. Alternatively, the compensating coupling 456 can be connected on the one hand to the spindle end 132.1 and on the other hand to the shaft end 140.1 by an integrally bonded connection, for example by an adhesive connection or a welding connection.

Said compensating coupling 456 is fastened, for example, on the output shaft 140 and the spindle 132 either by a clamping force, produced for example via screws at engagement points 462, or by an adhesive connection. Pressing on is also conceivable. Further known forms of connection are also possible.

LIST OF REFERENCE SIGNS 100 vehicle seat
102 seat part
104 backrest
106 fitting
108 axis of rotation
110 longitudinal adjuster
112 rail arrangement
114 first rail (top rail)
116 second rail (bottom rail)
118 pair of rails
120 drive device
122 geared motor
122.1 housing
124 motor
126 gear unit
127 internal thread
128 cavity
130 spindle block
130.1 internal thread
132 spindle
132.1 spindle end
132.2 external diameter
133 bearing plate
134 external thread
136 coupling arrangement
138 spindle nut
138.0 internal thread
138.1 collar
138.2 inside diameter
138.3 stop ring
140 output shaft
140.1 shaft end
140.2 outside diameter
142 spindle axis
146 spindle bearing
146.1 axial ball bearing
146.2 bearing bushing
148 connecting bolt
150 common axis
152 connecting nut
154 axis of rotation of the coupling arrangement
156 flexible coupling
157 offset
158 press-fit bushing
158.1 outside diameter
158.2 inside diameter
256 hose coupling
256.1 fabric
256.2 inside diameter
258 coupling element
258.1 knurled edge
258.2 collar
356 claw coupling
358 claws
360 nut element
362 claw mating element
364 external toothing
366 additional element
366.1 flange
368 carry-along contour
456 compensating coupling
458 sleeve coupling
460 recess
462 engagement point
x longitudinal direction y transverse direction
z vertical direction

What is claimed is:

1. A longitudinal adjuster, comprising:
one pair of rails and
a drive device for the pair of rails,
wherein the pair of rails has a first rail and a second rail, on which the first rail is guided displaceably,
wherein the drive device has at least one geared motor with an output shaft, a motor, a gear unit, a spindle, which can be driven by the output shaft via the gear unit, and a coupling arrangement for coupling the spindle and the output shaft,
wherein the spindle is mounted rotatably about a spindle axis,
wherein the coupling arrangement comprises a flexible coupling which is connected in a form-fitting and/or force-fitting manner on the one hand to a spindle end and on the other hand to a shaft end of the output shaft and which connects the spindle end and the shaft end flexibly to each other,
wherein the flexible coupling is configured as a claw coupling,
wherein the claw coupling is provided with respective claws at both ends, and a nut element arranged in a form-fitting manner on the spindle end is provided with claw mating elements.

2. The longitudinal adjuster according to claim 1, wherein the flexible coupling connects the spindle end and the shaft end flexibly to each other in such a manner that these ends are connected pliably and/or compressibly to each other and move flexibly towards each other or move away from each other or move relative to each other compensating for an angular offset.

3. The longitudinal adjuster according to claim 1, wherein the flexible coupling connects the spindle end and the shaft end flexibly to each other in such a manner that the spindle and the output shaft are separated from each other in terms of vibration.

4. The longitudinal adjuster according to claim 1, wherein the flexible coupling connects the spindle end and the shaft end flexibly to each other in such a manner that they are mounted movably with respect to each other in at least two degrees of freedom in a plane with respect to the spindle axis and in a plane perpendicular to the spindle axis.

5. The longitudinal adjuster according to claim 1, wherein the flexible coupling connects the spindle end and the shaft end flexibly to each other and is designed to damp vibrations and/or to compensate for an offset between the spindle end and shaft end.

6. The longitudinal adjuster according to claim 1, wherein the flexible coupling is configured as a hose coupling.

7. The longitudinal adjuster according to claim 6, wherein the hose coupling has an inside diameter which is smaller than an outside diameter of the spindle end and of the shaft end.

8. The longitudinal adjuster according to claim 6, wherein the hose coupling is torsionally rigid.

9. The longitudinal adjuster according to claim 1, wherein the claw coupling is coupled in a form-fitting manner to the spindle end and to the shaft end.

10. The longitudinal adjuster according to one of claim 1, wherein the flexible coupling is configured as a compensating coupling and is designed to compensate for an angular offset and/or a parallel offset, between the spindle and the output shaft.

11. The longitudinal adjuster according to claim 10, wherein the compensating coupling is configured as a sleeve coupling which comprises a plurality of recesses which are configured and arranged in such a manner that bending regions are alternately formed.

12. A vehicle seat with the longitudinal adjuster according to claim 1.

13. A longitudinal adjuster, comprising:
one pair of rails and
a drive device for the pair of rails,
wherein the pair of rails has a first rail and a second rail, on which the first rail is guided displaceably,
wherein the drive device has at least one geared motor with an output shaft, a motor, a gear unit, a spindle, which can be driven by the output shaft via the gear unit, and a coupling arrangement for coupling the spindle and the output shaft,
wherein the spindle is mounted rotatably about a spindle axis,
wherein the coupling arrangement comprises a flexible coupling which is connected in a form-fitting and/or force-fitting manner on the one hand to a spindle end and on the other hand to a shaft end of the output shaft and which connects the spindle end and the shaft end flexibly to each other,
wherein the flexible coupling is configured as a compensating coupling and is designed to compensate for an angular offset and/or a parallel offset, between the spindle and the output shaft.

* * * * *